(12) United States Patent
Mercier (10) Patent No.: US 11,578,606 B2
(45) Date of Patent: Feb. 14, 2023

(54) FLUID DISPLACEMENT TURBINE

(71) Applicant: Cesar Mercier, Roseland, NJ (US)

(72) Inventor: Cesar Mercier, Roseland, NJ (US)

(73) Assignee: Cesar Mercier

( * ) Notice: Subject to any disclaimer, the term of this patent is extended or adjusted under 35 U.S.C. 154(b) by 0 days.

(21) Appl. No.: 16/615,773

(22) PCT Filed: Nov. 21, 2018

(86) PCT No.: PCT/US2018/062285
§ 371 (c)(1),
(2) Date: Nov. 21, 2019

(87) PCT Pub. No.: WO2019/104197
PCT Pub. Date: May 31, 2019

(65) Prior Publication Data
US 2021/0277786 A1   Sep. 9, 2021

Related U.S. Application Data

(60) Provisional application No. 62/590,071, filed on Nov. 22, 2017.

(51) Int. Cl.
*F03B 17/06* (2006.01)
*F01D 7/00* (2006.01)
*F01D 15/12* (2006.01)

(52) U.S. Cl.
CPC ............ *F01D 7/00* (2013.01); *F01D 15/12* (2013.01); *F03B 17/065* (2013.01); *F03B 17/067* (2013.01); *F05B 2240/14* (2013.01)

(58) Field of Classification Search
CPC .... F03B 17/067; F03B 17/065; F03B 17/068; F03B 3/00; F03B 3/06; F03B 3/12; F03B 3/04; F03B 3/0418; F03B 7/041; F05B 2260/79; F05B 2240/14
See application file for complete search history.

(56) References Cited

U.S. PATENT DOCUMENTS

| | | | | |
|---|---|---|---|---|
| 5,324,164 A * | 6/1994 | Doering | ............... | F03B 17/067 415/150 |
| 6,734,576 B2 * | 5/2004 | Pacheco | ............... | F03B 17/065 290/55 |
| 6,849,964 B2 * | 2/2005 | Becherucci | ........... | F03D 3/0427 290/43 |
| 7,855,468 B2 * | 12/2010 | Lin | ........ | F03B 17/065 290/43 |
| 8,794,904 B2 * | 8/2014 | Kumano | ............... | F03B 17/065 416/111 |
| 9,938,958 B2 * | 4/2018 | Rubio | ................... | F03B 17/063 |
| 2010/0096856 A1 * | 4/2010 | Janca | ........................ | H02P 9/04 290/52 |
| 2011/0142625 A1 * | 6/2011 | Mowat | ................... | F03B 17/067 416/119 |

* cited by examiner

*Primary Examiner* — Richard A Edgar
*Assistant Examiner* — Behnoush Haghighian (57) ABSTRACT

A turbine which uses fluid pressure to turn a shaft in a manner that does not allow for cavitation to be created.

3 Claims, 8 Drawing Sheets

SECTION A-A
SCALE 1 : 3

SECTION A-A
SCALE 1 : 3

SECTION B-B
SCALE 1 : 3

SECTION C-C
SCALE 1 : 2

FLUID DISPLACEMENT TURBINE

BACKGROUND OF THE INVENTION

A conventional turbine has gaps between the runner blades. Fluid rushes through these gaps while turning the runner. The force extracted is proportional to the force necessary to deflect the fluid. Cavitation is created due to the high pressure fluid leaving the surface of the runner blades and directly to a lower pressure outlet. My turbine uses the fluid pressure to continuously turn the runner, similar to water in a syringe. My turbine closes the inlet chambers, and keeps it closed at all time. The next runner blade closes the inlet chamber before outlet ports are open to allow now trapped low pressure fluid to be pushed out the outlet ports of the turbine.

SUMMARY OF THE INVENTION

It is an object of this invention to provide a turbine that significantly does not allow for cavitation to occur.

It is another object of this invention to provide a turbine which uses fluid pressure to turn a shaft.

It is another object of his invention to provide a turbine which significantly balances all forces except for the force acting on the turbine blades forcing the blades to rotate the runner.

It is another object of this invention to provide a turbine with a directly attached governor. This governor can run underwater along with the turbine to be lubricated with water.

It is another object of this invention to provide a turbine that uses less water. The open gaps between blades in conventional Francis turbines are now closed to prevent water from rushing through and cause cavitation to occur.

It is another object of this invention to provide a turbine which is more efficient and produces more power due to fluid pressure management with valves acting on the runner blades.

It is another object of this invention to provide a turbine that is more efficient at all speed than conventional turbines. This turbine can run at very low speed while preventing fluid from escaping. Contrary to a Francis turbine, the inlet chamber in the runner is closed before the outlet ports are open. This prevents high pressure and fluid speed from leaving the turbine.

It is another object of this invention to provide a turbine with valves that block high pressure fluid from also pushing backwards on the runner blades. Unlike other turbines that may have valves to control backward flow, the force of the high pressure fluid still ends up pushing on the valves as they are being closed. The valves in turn push on the runner blades causing the force to be transferred in a backward direction on the runner blades. My turbine uses the high pressure intake fluid to balance the force on each end on the valve. Therefore, the fluid pressure and force is not transferred back to the runner blades in backwards direction.

It is another object of this invention to provide a turbine that can run under water to control noise pollution. The high pressure fluid intake quietly pushes on the runner blades, one after another, then close the intake chamber cutting off the pressure of the fluid between blades before allowing the trapped fluid to exit gently through the outlet ports. Turning the turbine in opposite direction will function as a displacement pump.

It is another object of this invention to provide a governor that can run under water along with the turbine. The governor can use water to function. The governor may also use oil in a close loop to function.

It is another object of this invention to provide a governor that can be attached directly to the working shaft of the turbine.

REFERENCE NUMERALS

Number Description
1 Flow direction
2 Runner with fixed blades
2s Shaft
3 valves
4 Strut
5 Side turbine casing with fixed runner blades.
6 Top turbine casing with fixed runner blades
7 Bottom turbine casing with fixed runner blades
8 Bolts
10 Runner hub
11 Rotary runner blades
12 Driveshaft
13 Top turbine casing with rotary runner blades
14 Bottom turbine casing with rotary runner blades
15 Wicket gates
16 Wicket Gate Lever
17 Wicket Gate Cam Plate
20 Governor body
21 Governor cover
22 Governor driving gear
23 Governor driven gear
24 Governor valve
25 Governor control screw
26 Governor support screw

DETAILED DESCRIPTION OF THE PREFERRED EMBODIMENTS

Figure 1A:
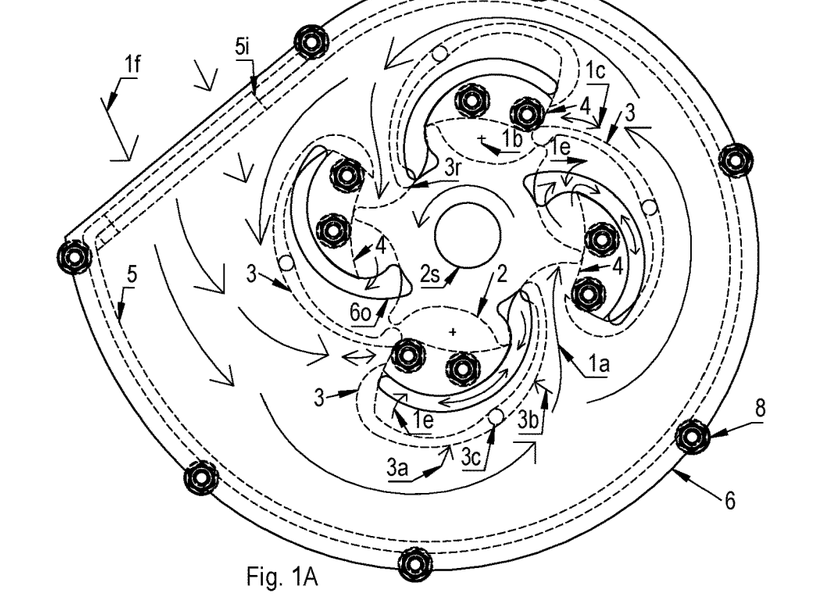
FIG. 1A shows fluid flow in turbine with fixed runner blades.

A top view of a turbine with fixed runner blades 2 is illustrated in FIG. 1A. A plurality of valves 3 is used to block fluid pressure 1*a* from pushing backward on the fixed runner blades. The valves pivot about center axis 3*c*. Fluid pressure 3*a* and 3*b* act on opposite ends of valve axis 3*c*. This causes the valve to be balanced. Therefore, the force necessary to actuate the valves is negligible. This valve design causes the pressure of fluid 1*a* to push forward in the desired direction while blocking the fluid from pushing backwards on runner 2. Fluid 1*c* is blocked from going through the runner blades before the trapped fluid 1*b* is allowed to exit the outlet ports 6*o*. This prevents cavitation from forming due to the fact that fluid pressure 1*b* is no longer high due to the closing of the valve 3. Therefore the runner blades are now able to push the trapped fluid 1*b* out to outlet ports 6*o*. Low pressure fluid 1*e* underneath the valves 3 is pushed out as the valves pivots back and forth. Fluid if enters the turbine in this figure through intake pipe 5*i*. The side wall 5 of this turbine has simple curves to ease manufacturing. A plurality of struts 4 is used to support the top turbine case 6 to the bottom one. A plurality of bolts 8 are used to hold the turbine assembly together. The shaft 2*s* and the turbine blades form a gear whereas the fluid flow outlines the direction of the force pushing on the gear.

Figure 1B:
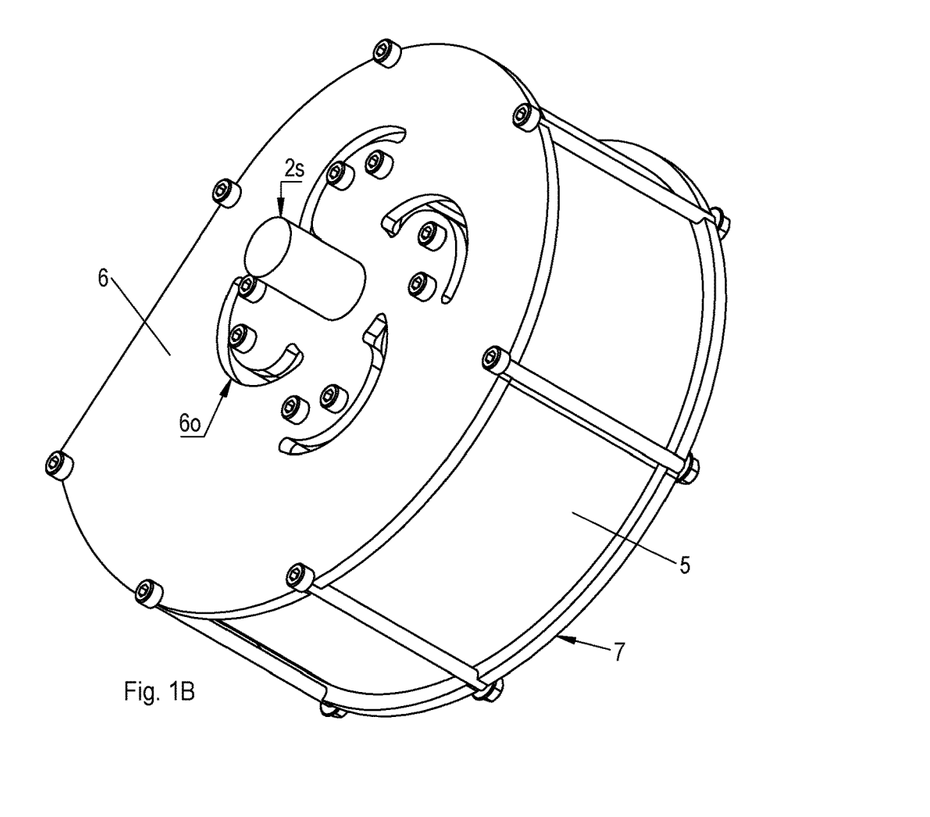
FIG. 1B shows an isometric view of turbine with fixed runner blades.

An isometric view of the turbine with fixed blades is illustrated in FIG. 1B. The shaft 2*s* is extruded from top case 6. The outlet ports 6*o* also pierce bottom case 7. The side wall 5 forms a volute case to maintain pressure all around.

Figure 2:
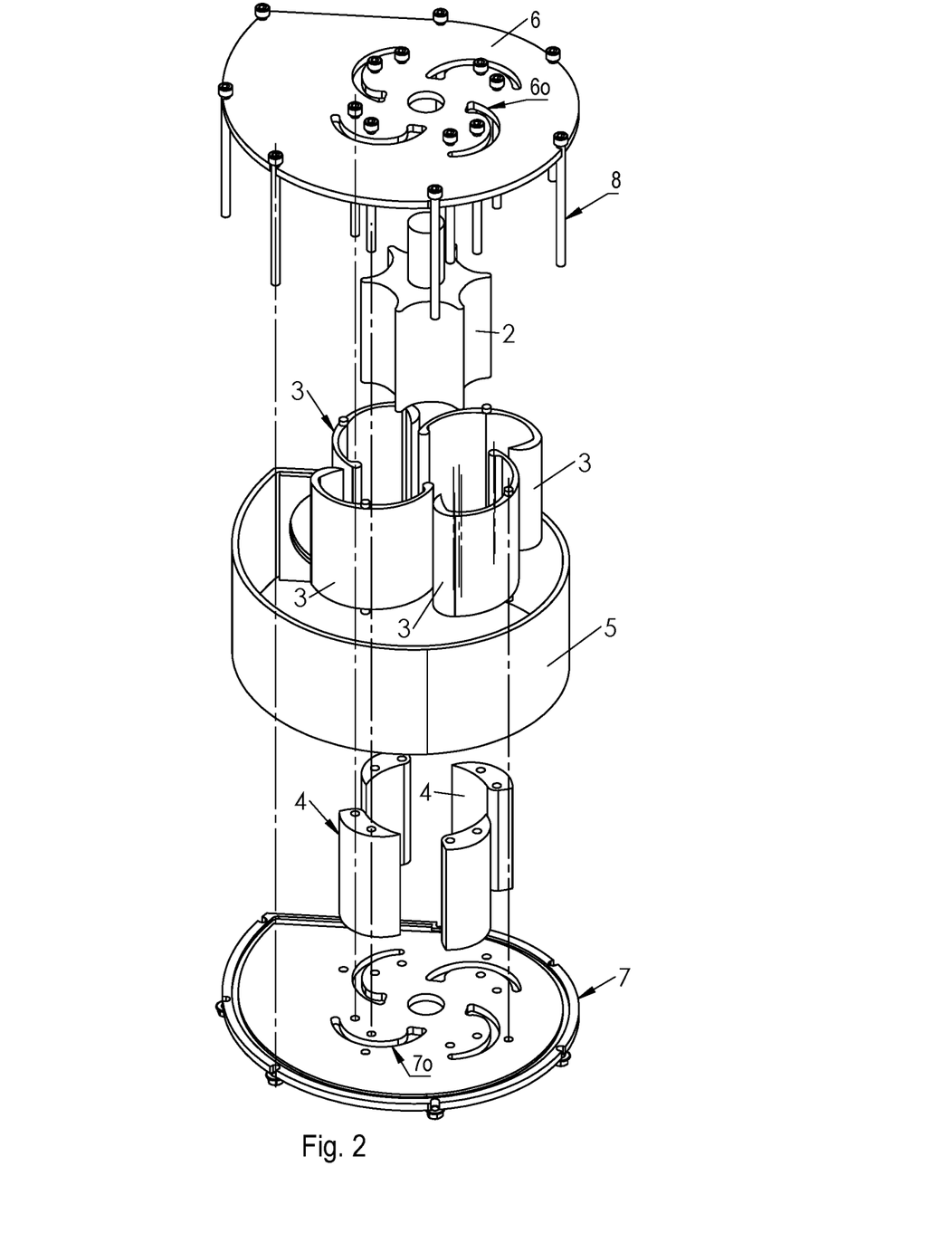
FIG. 2 shows an exploded view of a turbine with fixed runner blades.

An exploded view of the turbine with fixed blades is illustrated in FIG. 2. The top case 6 shows the outlet ports 6*o* and the bolts 8 which are used to hold the side case 5, the bottom case 7 and the struts 4 together. The fluid exits the turbine both on top 6*o* and bottom 7*o* ports. The valves 3 work in parallel to leverage pressure on the opposite end to balance the turbine. The runner 2 forms one piece with the shaft, but can be separate.

Figure 3A:
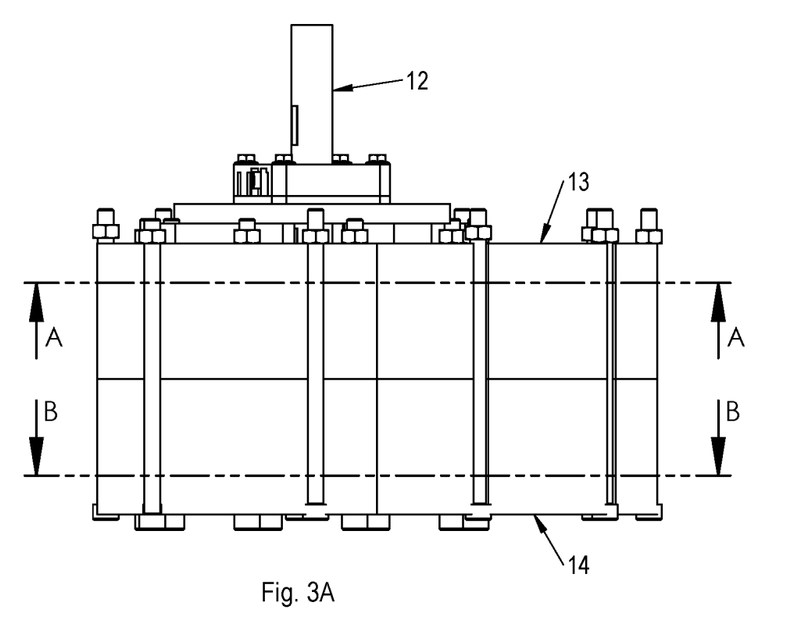
FIG. 3A shows a side view of a turbine with rotary runner blades.
Figure 3B:
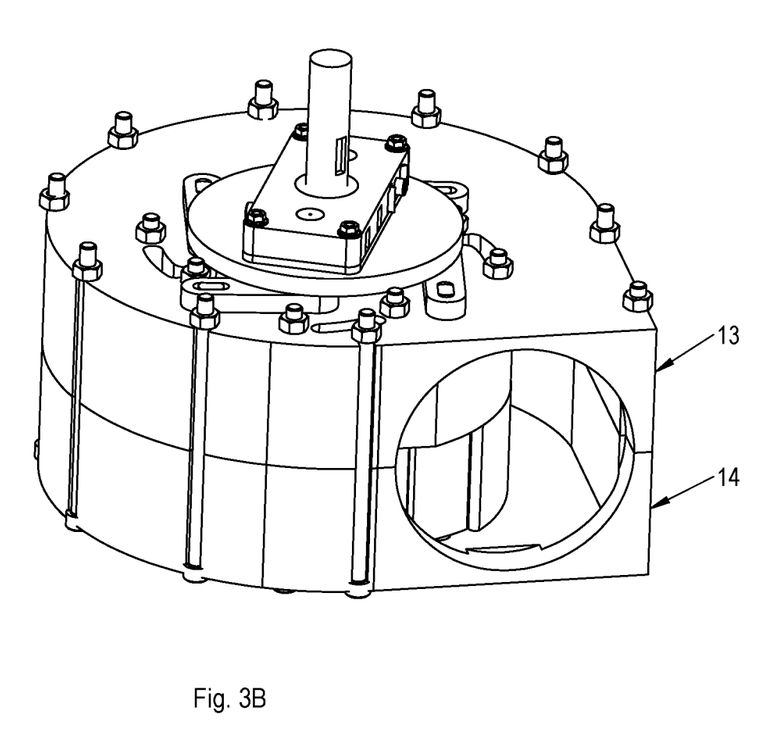
FIG. 3B shows an isometric view of a turbine with rotary runner blades.

Another version of the turbine is illustrated in FIG. 3A, which is a side view of a turbine with rotary runner blades. This turbine is made of a top case 13 and a bottom case 14. FIG. 3B is an isometric view of this turbine further illustrating the design.

Figure 4:
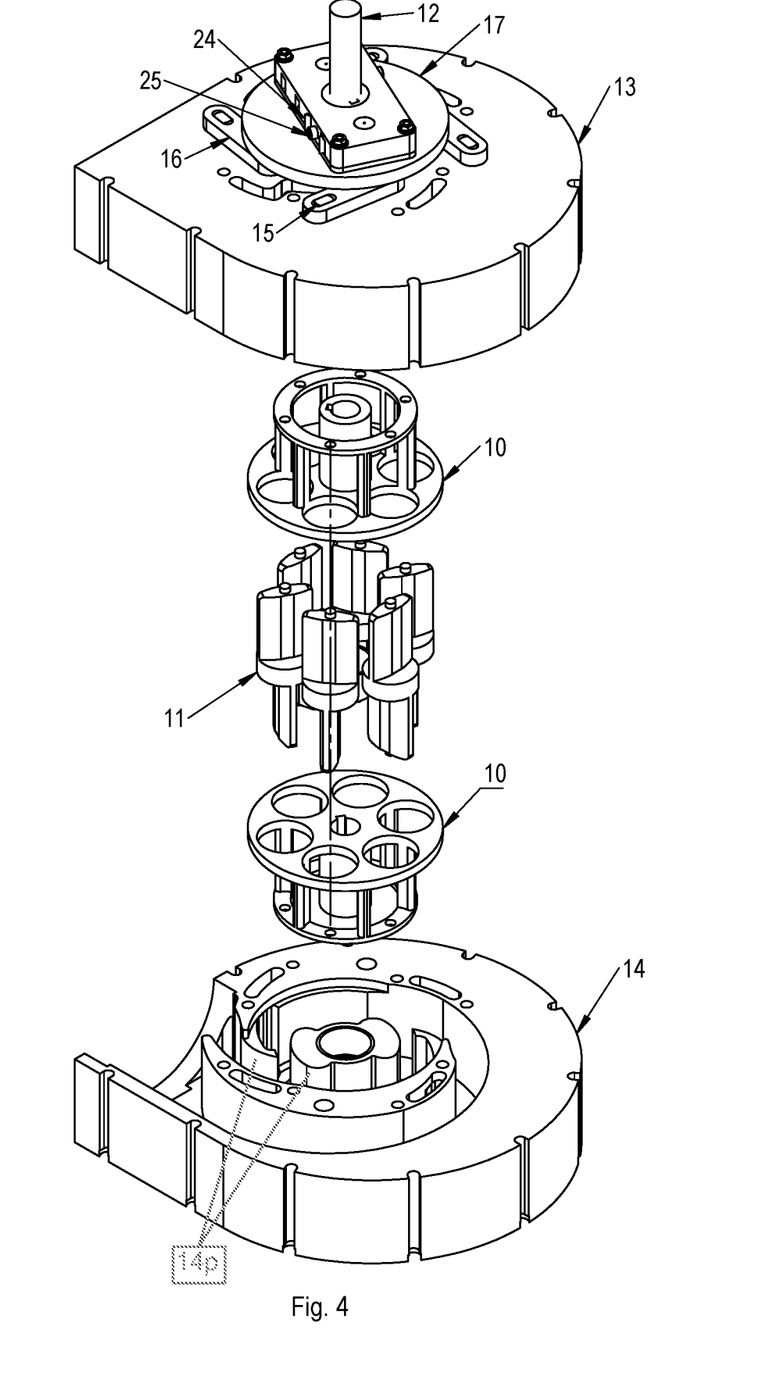
FIG. 4 shows an exploded view of a turbine with rotary runner blades.

An exploded view of the turbine with rotary runner blades is illustrated in FIG. 4. The rotary blades 11 are sandwiched within the two runner housing 10 forming the runner with rotary blades assembly. This assembly is further sandwiched within the top case 13 and bottom case 14. A turbine shaft 12 is mounted through a governor assembly comprising a wicket cam plate 17, wicket gates 15, and wicket gate lever 16. A governor control screw 25 is used to control the amount of fluid exiting the governor by adjusting valve 24. The speed of the shaft will determine the amount of water going through the valves 24. The faster the shaft spins, the more resistance and force is applied on the wicket gate levers. Blade 11 on the side facing the top turbine case is perpendicular to the side facing the bottom case. Blade 11 can be adapted to be relatively flat while using an external protrusion to rotate the blades to aerodynamically reduce the cross section surface area of the blades facing backward direction. Therefore, pressure which is normally equal in all directions is now substantially greater in one direction to turn the runner in the preferred direction. Blade 11 may be adapted with rollers and corresponding seals to allow for longevity and lower friction.

Figure 5A:
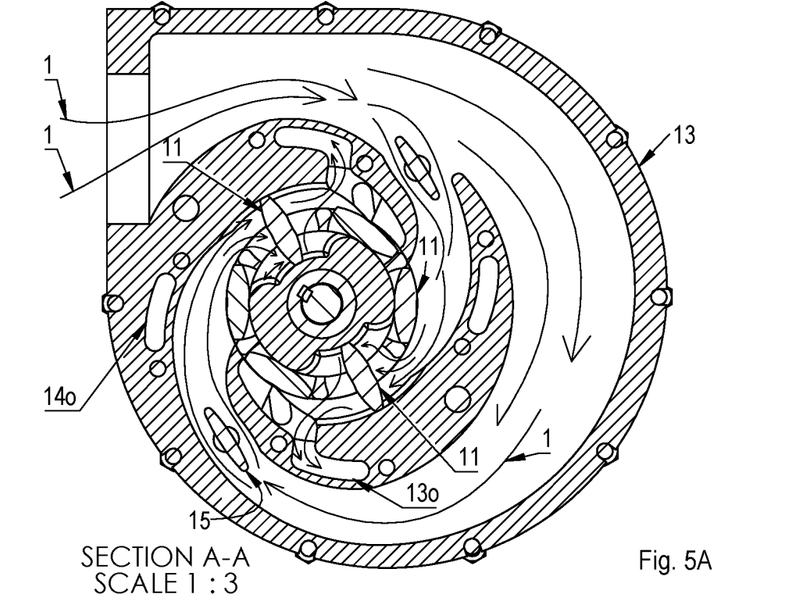
FIG. 5A shows fluid flow in top turbine casing with rotary runner blades.

A section view of the top case 13 is illustrated in FIG. 5A. Fluid flow 1 enters runner chamber to push on rotary blades 11. Fluid pressure is distributed on both ends of the rotary blades 11. As the runner with rotary blades turns, the fluids on the other side of the rotary blades exit the outlet ports 130. When at least one pair of rotary blades is in open position, the others are in closed position. The blades work in pair and parallel to each other to balance the forces all around the runner. Ports 14*o* allows outlet fluid from bottom case to exit the turbine.

Figure 5B:
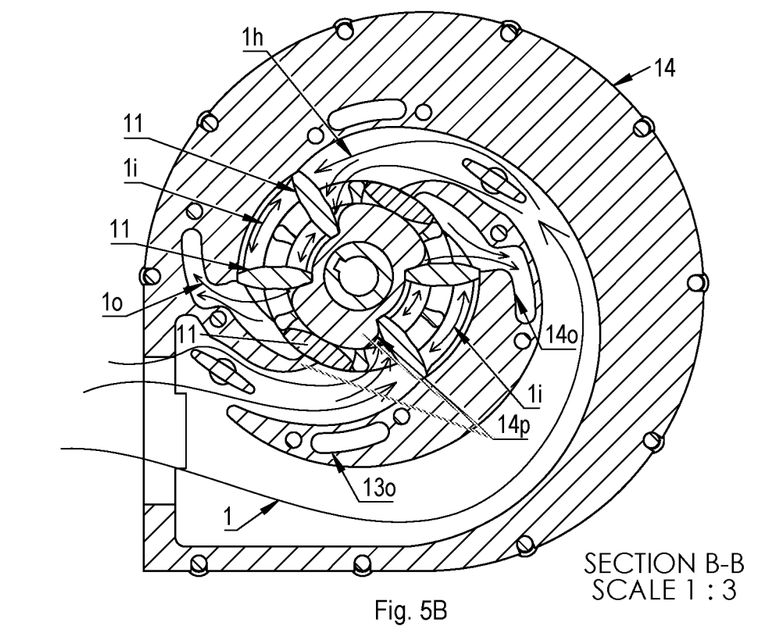
FIG. 5B shows fluid flow in bottom turbine casing with rotary runner blades.

A section view of the bottom case 14 is illustrated in FIG. 5B. Fluid flow 1 enters the runner chamber where the high pressure fluid 1*h* is stopped by the rotary blade 11, and right before the other rotary blade 11 opens the ports 14*o* to allow now trapped fluid 1*i* to exit the turbine through ports 14*0*. Port 13*o* allows outlet fluid from the top case to exit through the bottom case as 10. Runner blade 11 functions like a valve, so I will also refer to it as valve 11. Protrusion 14*p* is used to respectively close and open valves 11. When rotary valve 11 is closed at the top section of the runner assembly, the same rotary valve 11 is open at the bottom section of the runner assembly. The rotary valve can be fitted with bearings, and it can be made of more than one piece. Protrusion 14*p* can be used to rotate valve 11 in one direction, wherein valve 11 may be closed by another protrusion in opposite direction. Protrusion 14*p* is also used to prevent fluid from pushing backwards on valve 11. Valve 11 rotates about its axis at the center. Valve 11 may be adapted to rotate near or at one of its end. Valve 11 rotates parallel to the shaft. The axis of valve 11 is parallel to the shaft. However, the axis of valve 11 may be adapted to be perpendicular to the shaft.

Figure 6A:
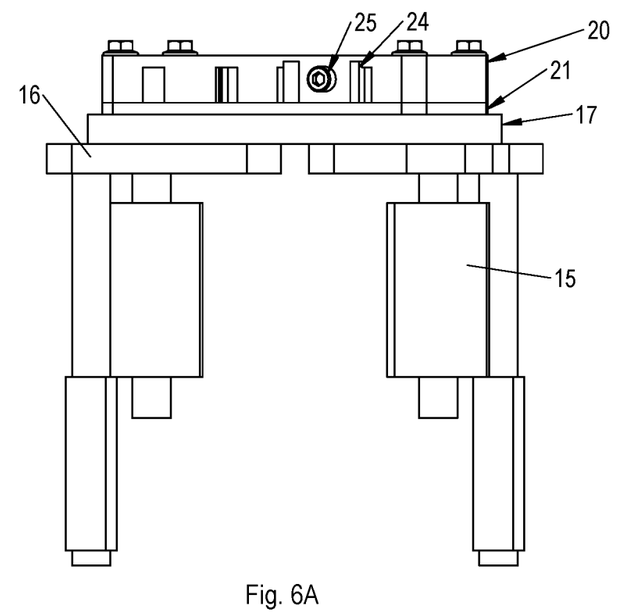
FIG. 6A shows a side view of a Governor Assembly.
Figure 6B:
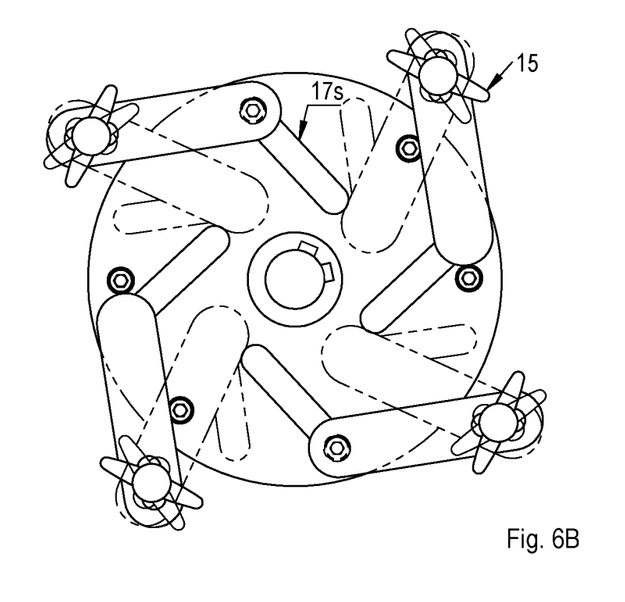
FIG. 6B shows a bottom Alternate Positions view of governor assembly.

A side view of a governor assembly is illustrated in FIG. 6A. Wicket gates 15 are attached to wicket gate levers 16 which have protrusions that will allow the wicket gates to turn as wicket gate cam 17 turns. A gear pump within governor body 20 and governor cover 21 is used to create pressure in one direction as the turbine shaft spins. The faster the shaft spins, the more pressure there is, and the more force is applied on the wicket gates to close them. Therefore the speed of the shaft controls how wide the wicket gates are open. The wicket gates control how fast the turbine shaft spins. Control screw 25 is used to open, semi-open, or close valve 24 which controls the pressure and force acting on the wicket gates. FIG. 6B illustrates how the wicket gates turn. A protrusion on wicket gate lever 16 glides within slot 17*s* on the wicket gate cam plate 17. A conventional wicket gate arm links may be used instead. Wicket gate 15 turns with the governor body 20.

Figure 7A:
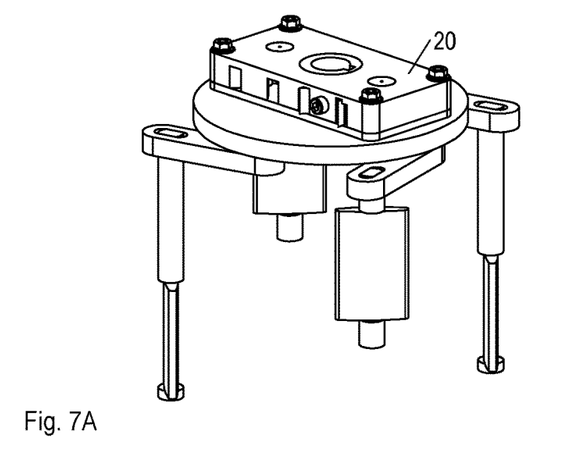
FIG. 7A shows an isometric view of a governor assembly.
Figure 7B:
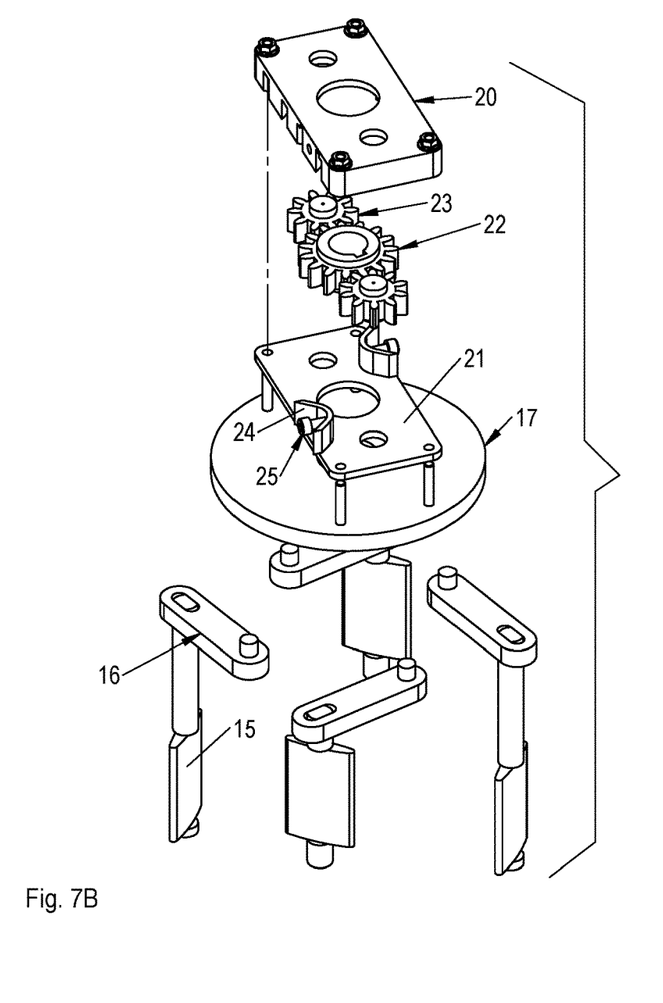
FIG. 7B shows an exploded view of the governor assembly.

An isometric view of the governor assembly is illustrated in FIG. 7A. The governor body turns with the other components. FIG. 7B is an exploded view of the governor assembly. Driving gear 22 is used to spin with the turbine shaft. At least one driven gear 23 is used to displace fluid within the governor body 20 and governor cover 21. Control screw 25 controls how much fluid goes through valve 24. Governor body 20 is screwed on the wicket gate cam plate 17, which turns wicket gate lever 16 due to protrusion mounted on the latter. The lever 16 then rotates the wicket gates 15.

Figure 8A:
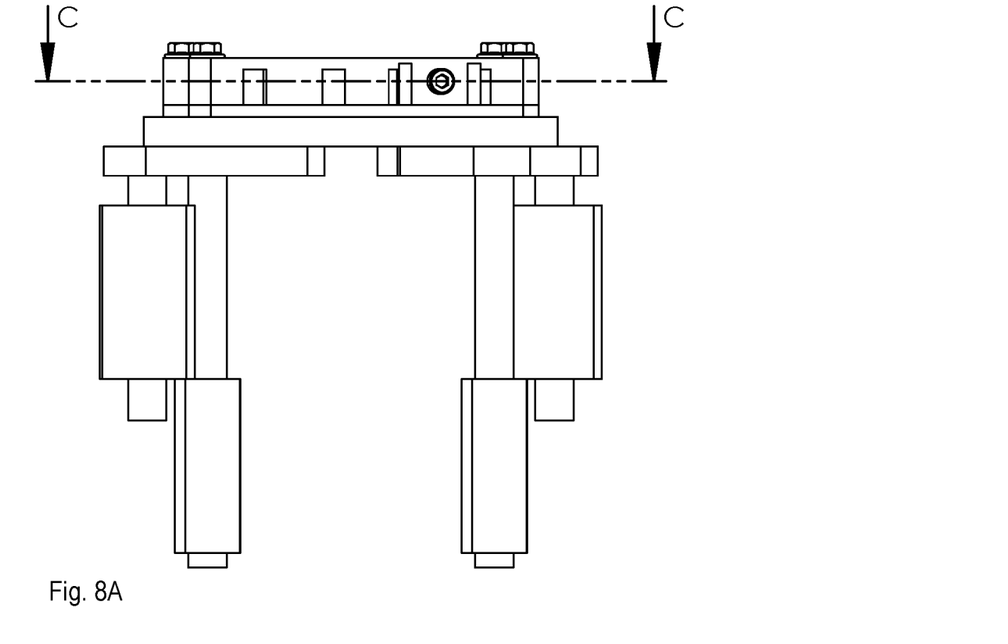
FIG. 8A shows a side view of the governor assembly.
Figure 8B:
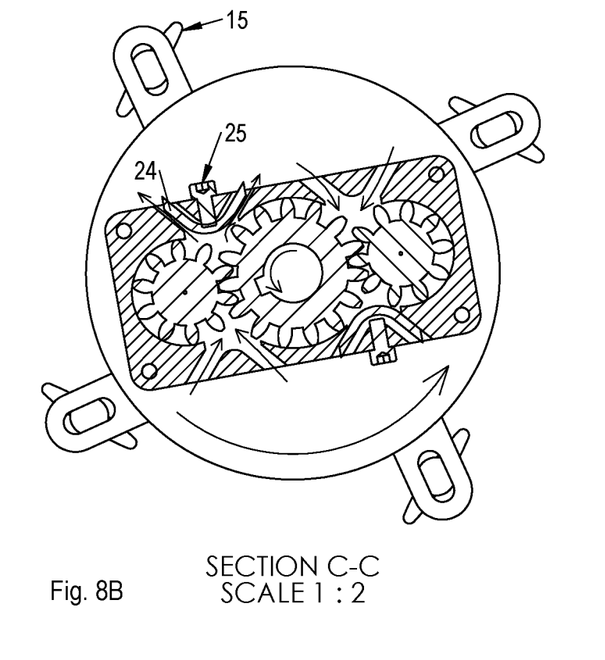
FIG. 8B shows a cross section view of the governor assembly.

A section view of the governor is illustrated in FIG. 8B. This view illustrates the fluid flow within the governor body. This view also illustrates how control screw 25 controls the opening of the valve 24. This view also illustrates the rotation direction of the governor in relations to the rotation of the turbine shaft. The length of the wicket gate lever provides significant amount of torque on the wicket gates 15.

The invention claimed is:
1. A turbine with rotary blades comprising:
a top turbine casing comprising a top plate with a top peripheral wall at its outermost radial circumference, a top central hole, and a top partial wall between the top central hole and the top peripheral wall, a bottom turbine casing comprising a bottom plate with a bottom peripheral wall at its outermost radial circumference, a bottom central hole, and a bottom partial wall between the bottom central hole and the bottom peripheral wall, wherein the top peripheral wall, the top central hole, and the top partial wall axially align with the bottom peripheral wall, the bottom central hole, and the bottom partial wall, a fluid inlet in the top and bottom peripheral walls, and fluid outlets in the top and/or bottom plates, a runner hub extending between the top turbine casing and the bottom turbine casing, the runner hub comprising a central hole, symmetrical protrusions on its periphery, and symmetrical recesses between the two symmetrical protrusions, a shaft passing through the central hole of the runner hub, the top central hole, and the bottom central hole, a plurality of rotary blades radially between the runner hub and the top and bottom partial walls, and axially extending between the top plate and the bottom plate, wherein fluid enters through the fluid inlet, pushes on the plurality of rotary blades to form a closed chamber between the plurality of rotary blades, the runner hub, and the partial walls, rotates the runner hub and the shaft, and exists through the fluid outlets.

2. The turbine according to claim 1, wherein a governor is attached directly or indirectly to the shaft, the governor comprising:
   a) A governor housing,
   b) A least one driving gear,
   c) A least one driven gear,
   d) A least one valve,
   e) A least one control screw; wherein the fluid is displaced by the gears to create resistance and force as the shaft spins faster, wherein the force generated is used to rotate attached wicket gates, wherein the shaft is connected to the at least one driving gear, wherein the at least on control screw is used to control fluid flow within the governor housing by controlling how wide the at least one valve is open.

3. The turbine according to claim 1, wherein the protrusions aid in rotating the plurality of rotary blade.

* * * * *